United States Patent [19]

Elsing et al.

[11] Patent Number: 5,140,479

[45] Date of Patent: Aug. 18, 1992

[54] STATIC ELIMINATOR FOR DISC DRIVE SPINDLE

[75] Inventors: John W. Elsing, Edina; William J. Kostecka, Jordan, both of Minn.

[73] Assignee: Seagate Technology, Inc., Scotts Valley, Calif.

[21] Appl. No.: 605,122

[22] Filed: Oct. 29, 1990

[51] Int. Cl.⁵ .............................................. G11B 33/14
[52] U.S. Cl. .............................. 360/97.01; 360/98.08
[58] Field of Search ................ 360/99.08, 97.01, 97.02

[56] References Cited

U.S. PATENT DOCUMENTS 3,855,623  12/1974  Chur ..................................... 360/103
4,585,963   4/1986  Wilkinson ......................... 360/99.08

4,623,952  11/1986  Pexton ................................. 361/220

Primary Examiner—A. J. Heinz
Attorney, Agent, or Firm—Kinney & Lange

[57] ABSTRACT

In a magnetic disc drive, an apparatus for eliminating electrical charge. The apparatus includes a preloaded coil compression spring and a contact button nested in a bored hole in the spindle shaft. The contact button is forced against a fixed arm by the coiled compression spring. The compression spring, contact button and fixed arm provide a low noise electrical pathway for discharge of electrical charge from the spindle. Alternatively, the coil spring and contact button are carried by the fixed arm, and the contact button is urges against the center of the end of the spindle shaft.

20 Claims, 3 Drawing Sheets

STATIC ELIMINATOR FOR DISC DRIVE SPINDLE

BACKGROUND OF THE INVENTION

The present invention is an apparatus that electrically grounds a disc drive spindle by providing an electrical pathway from the rotating disc drive spindle to the chassis. In particular, the invention discharges an electrical charge from disc in a magnetic disc drive system.

Magnetic disc drives act as mass storage devices for computers by selectively polarizing portions of a magnetic disc surface. In the continual drive to increase the storage capacity of magnetic disc drives, the density of data stored on the disc has been continually increased by decreasing the size of the polarized portions of the disc surface. Reduction in the size of the magnetically polarized bit positions on the disc results in a decrease in the signal strength induced in the read/write head as the surface of the magnetic disc passes under it. Accurate data transfer to and from the disc requires minimizing extraneous signals, or electronic "noise".

The magnetic disc typically rotates at speeds of up to 5400 revolutions per minute and is supported by a spindle. Both are driven by a spindle drive motor. In the process of rotation, considerable static electrical charge is built up on the disc and spindle. An electrical pathway to eliminate static charge must be provided. The static elimination system, itself, must not generate interfering noise.

Prior art static elimination systems rely upon a cantilevered arm spring loaded against the side of a rounded spindle shaft end. At the point of contact with the spindle shaft, a contact area contacts on the loaded spring arm. The material of the contact area is selected to enhance wear and electrical continuity characteristics. Problems with these designs include vibration, fluctuating continuity, and high resistance (about 20 K $\Omega$ to 5 M $\Omega$). All of these problems exacerbate the generation of electrical noise through the recording head and spindle drive bearings. This noise presents a potential barrier to the recording density achievable through thin film heads and magnetoresistive heads. Elimination of static charge without the attendant noise in conventional spindle grounding designs is necessary to increase information density on the disc.

In the cantilevered design of the prior art, the spring loaded arm typically has a resonant frequency of oscillation in the audible range. The energy input due to the rotation of the drive spindle causes the cantilevered spring arm to vibrate at its resonant frequency. Damping, or otherwise changing the frequency response of the spring has had limited success. Cantilevered designs also require a greater amount of space for the cantilevered arm. In addition, the resonance of the arm can alter the flying height of the head which changes the signal strength of the readback signal.

A disc drive having an inexpensive reliable contact to a drive spindle which provides improved frequency response and electrical continuity would be a significant contribution to the art.

SUMMARY OF THE INVENTION

The present invention is an apparatus which eliminates static charge from a disc drive spindle with greatly reduced vibration, continuity fluctuation, and electrical resistance. The resonant frequency of the contact is not in the audible range. Furthermore, the amplitude of the resonance is reduced due to the spring constant and the mass of the contact so that resonant vibrations do not interfere with the flying of the magnetic read/write head.

In the present invention, a hole is bored into the spindle shaft and a coiled compression spring inserted into the hole. Also inserted into the hole and pressing against the compression spring is a cylindrical contact button, preferably constructed of a low electrical resistance, light weight material such as teflon graphite or silver graphite. The contact button protrudes out of the spindle shaft and presses against an electrically conducting rigid cantilever beam which is mounted to a non-rotating portion of the disc drive housing and is electrically grounded to the disc drive chassis.

There are many advantages inherent in this invention compared with the conventional cantilevered spring arm approach. The low mass of the contact button allows use of a low spring constant and low operating force. Low spring constant and low operating force allow use of spring freelength and preload which are optimized to maintain consistent operating force. The combination of low mass, light preload, and low spring constant greatly reduces vibration and the attendant noise associated with conventional cantilevered spring arm static elimination systems.

In a preferred embodiment, the low spring constant of the coil spring is achieved by spring material selection and the use of small diameter wire. Light preload is achieved through a combination of the spring constant and the distance the spring is deflected after assembly.

Nearly constant force on the contact button against the rigid cantilever beam is maintained as the contact button wears down. This is achievable because the movement of the spring due to wear is small compared with the total deflection of the spring after assembly. This constant force results in less variability in the electrical resistance over time than a conventional system. The continually low force that the contact button exerts against the cantilever beam allows the contact button to be constructed of a softer, more conductive material yet have a reasonably long operating life. In a preferred embodiment, the invention uses a silver graphite material. The resulting resistance through the contact is about 1.0 $\Omega$ to about 20 $\Omega$, which is orders of magnitude less than conventional systems.

DETAILED DESCRIPTION OF THE PREFERRED EMBODIMENTS

Figure 1:
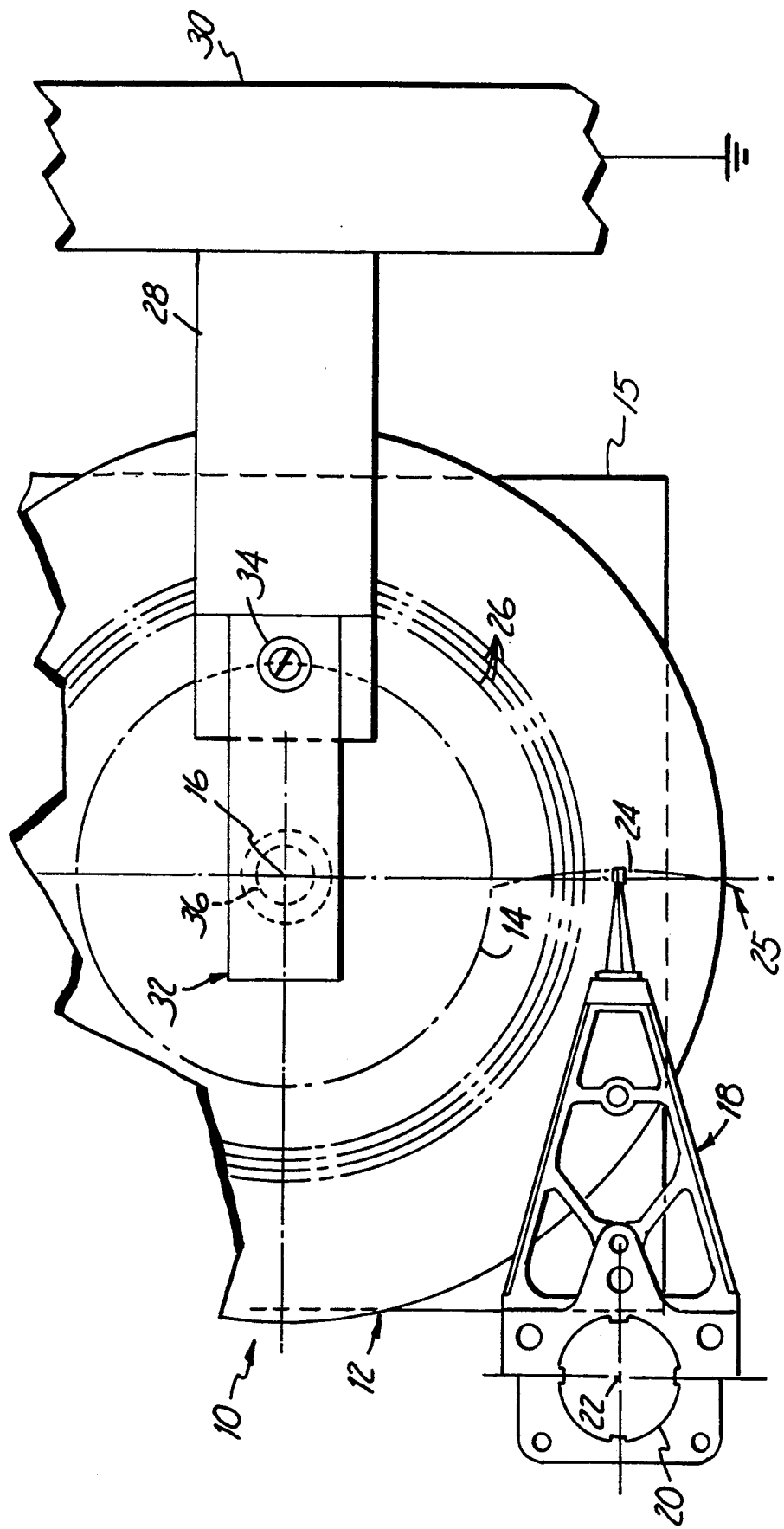
FIG. 1 is a top view of a disc storage system in accordance with the present invention.

A disc drive assembly 10 is shown in FIG. 1 which comprises a magnetic disc 12 fastened to a spindle 14. Spindle 14 and magnetic disc 12 are rotated by disc drive motor 15 about rotation axis 16.

A head support arm 18 is fastened to a servo spindle 20. Servo spindle 20 and head support arm 18 pivot about a pivot axis 22. A read/write head 24 is mounted on the tip of head support arm 18 and is supported by aerodynamic forces above magnetic disc 12 when magnetic disc 12 rotates.

As servo spindle 20 rotates, a read/write head 24 swings through an arc 25. As magnetic disc 12 rotates beneath read/write head 24, this pivoting motion allows read/write head 24 to change track positions 26 on magnetic disc 12.

A support arm 28 is attached to a chassis 30 and projects over magnetic disc 12 and spindle 14. Chassis 30 provides an electrical ground. A rigid contact arm 32 is fastened to support arm 28 with a screw 34 and projects over spindle 14.

Figure 2:
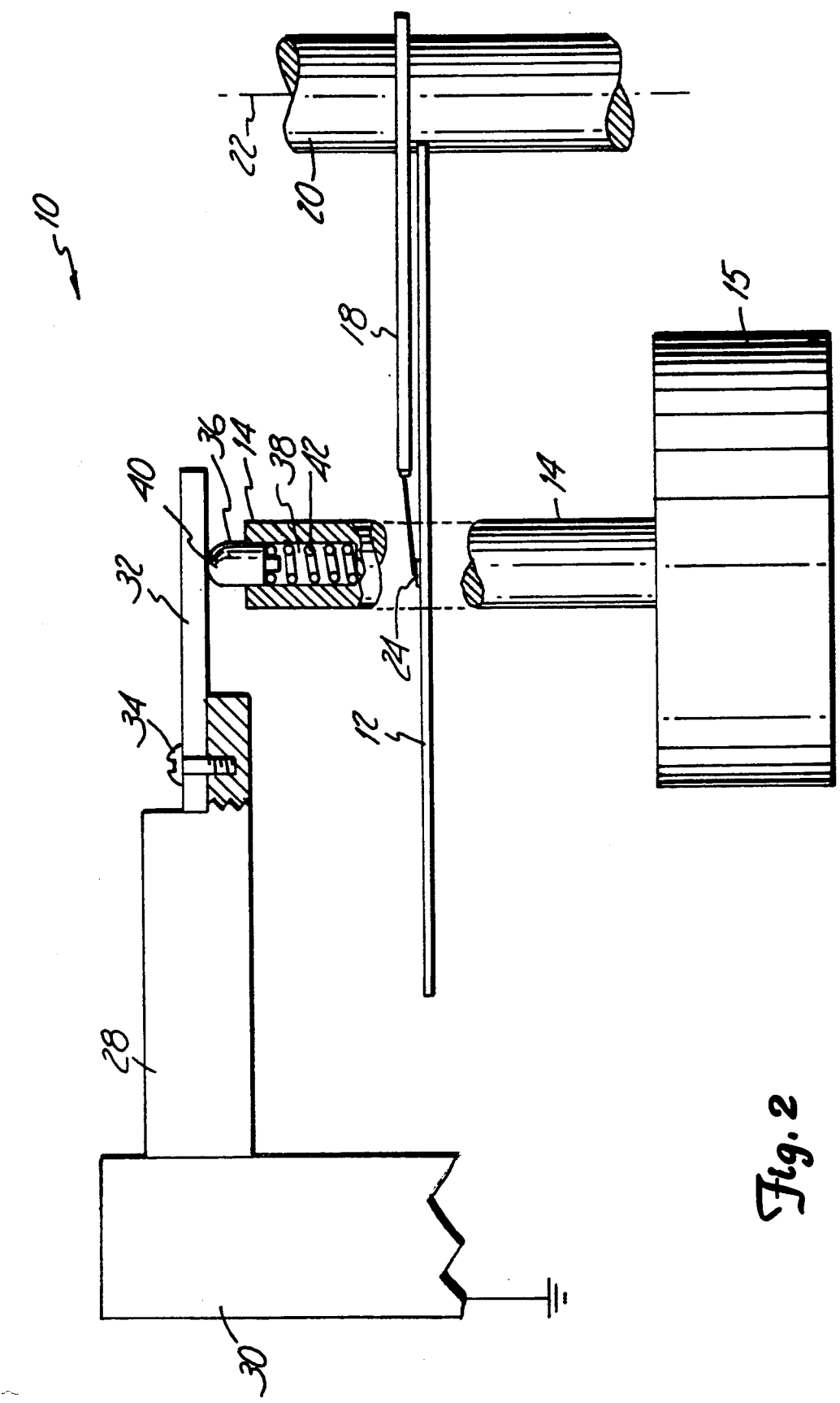
FIG. 2 is a side view of a disc storage system in accordance with the present invention.

FIG. 2 is a side view of disc drive assembly 10 showing contact button 36 which protrudes from a hole 38 in spindle 14. A contact area 40 of contact button 36 contacts rigid contact arm 32. A compressed coil spring 42 bears against contact button 36 and forces contact area 40 of contact button 36 against rigid contact arm 32.

In the embodiment of FIGS. 1 and 2, a low resistance electrically conducting path from spindle 14 is provided through compressed coil spring 42, contact button 36, rigid contact arm 32 and support arm 28.

Contact button 36 is free to slide upwards to accommodate for wear of contact area 40 and to maintain mechanical contact and electrical continuity with rigid contact arm 32.

In a preferred embodiment, spring length, material and spring constant of spring 42 are chosen to provide a very low contact force (on the order of 36 grams) when the components are assembled. This is achieved by compression of the spring to approximately one half its free length. Substantially constant contact force is maintained as contact button 36 wears because the movement of coil spring 42 due to wear is small compared to the total deflection of coil spring 42 after assembly.

The low contact force allows selection of softer, yet more highly conducting contact button material such as silver graphite or teflon graphite. (Suitable silver graphite is available from Polymer Corporation, P.O. Box 422, Reading, Pa., 19603 under the tradename Polymet-Ⓡ AG). This less resistive contact button material provides a very low resistance electrical contact between contact button 36 and contact arm 32. The low mass and soft material of contact button 36 combined with low contact force resulting from spring preload virtually eliminates vibration and electrical noise. Typically, contact arm 32 comprises 300 series or 400 series stainless steel.

In accordance with the present invention, the contact force between the contact button and the spindle should be about 36 grams, and preferably in a range of about 28 grams to about 60 grams. The spring constant should be about 52 grams/inch and preferably in a range of about 40 grams/inch to about 63 grams/inch. The coil typically comprises stainless steel, however beryllium copper or music wire is also suitable. The diameter of the wire is about 0.012 inches and preferably is in a range of about 0.010 inches to about 0.020 inches. The spring typically has about 43 coilings and preferably has about 34 coilings to about 52 coilings. The parameters may be adjusted to trade off between the vibration characteristic and good electrical contact.

Figure 3:
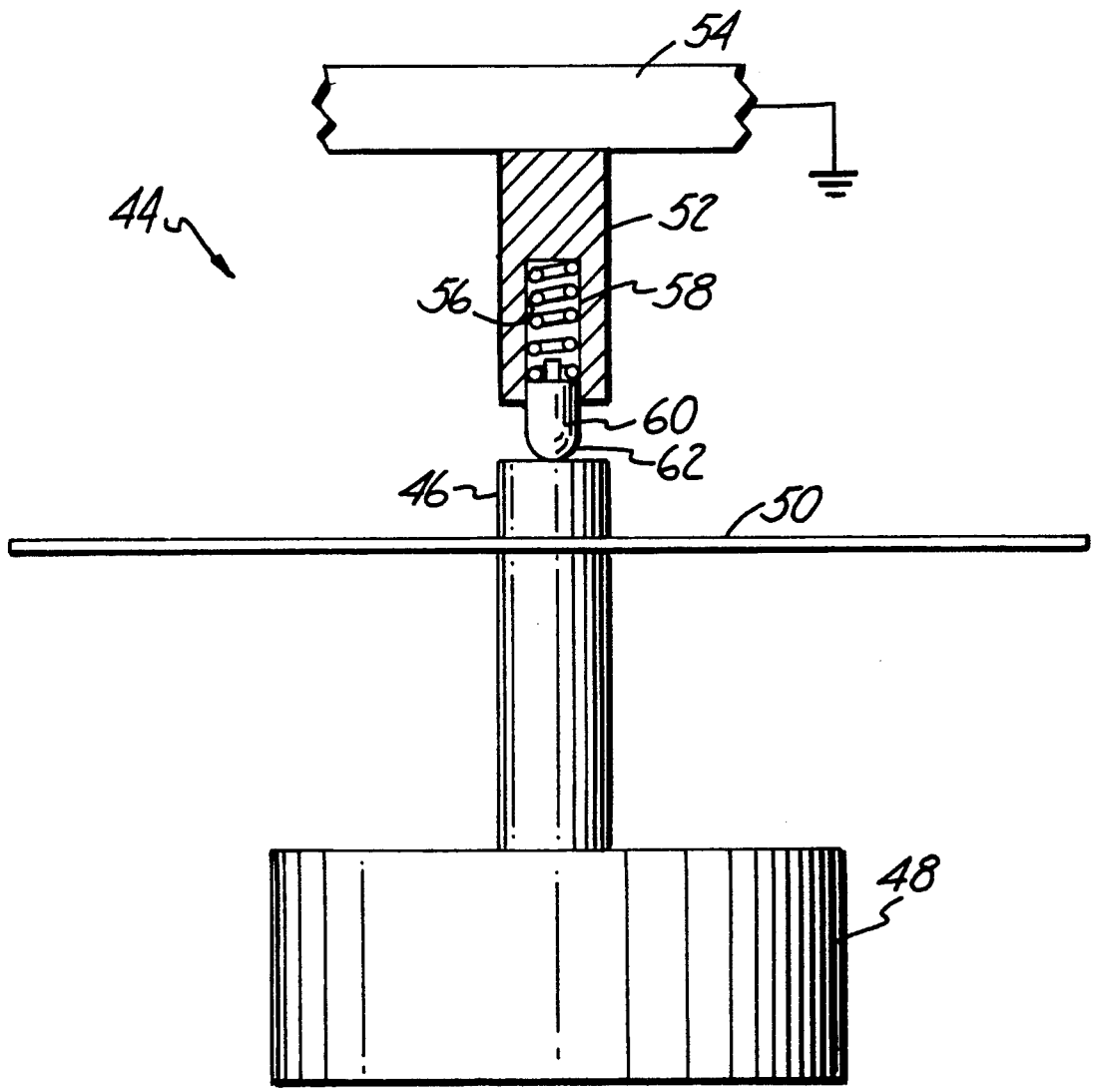
FIG. 3 shows another embodiment of the present invention in which a contact button and a coil spring reside in a hole in a fixed arm.

FIG. 3 is a side view of a magnetic disc drive assembly 44 incorporating another embodiment of the present invention. A spindle 46 is rotated by a disc drive motor 48. A magnetic disc 50 is fastened to spindle 46. A fixed support arm 52 is attached to a chassis 54. Chassis 54 is an electrical ground. Fixed support arm 52 has a bored hole 56 into which a coiled compression spring 58 and a contact button 60 are inserted. A contact area 62 of contact button 60 is pressed against spindle 46 by compressed coil spring 58.

The present invention provides an electrical contact to a drive spindle in a magnetic disc drive storage system. In accordance with the present invention, a spring loaded contact provides an electrical contact to the center of the drive spindle. The present invention provides a low noise contact. The invention reduces vibration, continuity fluctuation, and electrical resistance. Typically, the electrical contact button is constructed of a light weight, low electrical resistance material, such as teflon or silver graphite. The low mass of the electrical contact button allows use of a low spring constant and a low operating force. Low spring constant and low operating force allow use of spring freelength and preload which maintain consistent operating force. A small diameter wire is used to form the coil spring, which results in the low spring constant of the coil spring. The present invention provides a nearly constant contact force on the electrical contact button because the movement of the coil spring due to wear of the contact button is small compared with the total deflection of the coil spring. Because the contact force is nearly constant over time, the electrical resistance through the static electric discharge path remains relative stable. Furthermore, because the electrical contact button is subjected to only a small force, the electrical button may be constructed of a softer, more conductive material without significantly shortening its life span. In the present invention, the electrical discharge path through the contact typically has a resistance of only about 1.0 Ω to about 20 Ω.

Although the present invention has been described with reference to preferred embodiments, workers skilled in the art will recognize that changes may be made in form and detail without departing from the spirit and scope of the invention. For example, different contact button materials and shapes may be used. Additionally, different spring constants and preload forces may be selected.

What is claimed is:

1. A disc drive spindle grounding apparatus for discharging static charge from the spindle, the apparatus comprising:
   a contact button with a contact area on one end received in a disc drive spindle shaft, wherein the contact area protrudes out of the spindle shaft;
   an electrically grounded fixed contact arm operably coupled to the contact area of the contact button; and
   a loaded compression spring bearing against a face of the contact button and the disc drive spindle shaft for urging the contact button against the fixed contact arm to provide a low resistance electrical pathway between the disc drive spindle shaft and the electrically grounded fixed contact arm.

2. The apparatus of claim 1 wherein the loaded compression spring has a spring constant of about 40 grams/inch to about 63 grams/inch.

3. The apparatus of claim 1 wherein the fixed contact arm is a rigid structural member.

4. The apparatus of claim 1 wherein the contact button comprises silver graphite.

5. The apparatus of claim 1 where the loaded compression spring comprises a coil spring.

6. The apparatus of claim 5 wherein the coil spring has about 34 coilings to about 52 coilings.

7. The apparatus of claim 5 wherein the coil spring comprises coiled wire having a diameter of about 0.010 inches to about 0.020 inches.

8. The apparatus of claim 1 wherein the spring urges the contact button to produce a contact force between electrical contact button and the fixed contact arm of about 28 grams to about 60 grams.

9. The apparatus of claim 1 wherein electrical resistance between the disc drive spindle shaft and the fixed contact arm is about 1.0 $\Omega$ to about 20 $\Omega$.

10. An apparatus comprising:
- a magnetic storage disc for storing magnetically encoded information;
- a magnetic disc drive spindle coupled to the magnetic storage disc, the magnetic disc drive spindle having an axis of rotation wherein the magnetic disc drive spindle and the magnetic storage disc rotate around the axis of rotation;
- a chassis operably coupled to the magnetic disc drive spindle wherein the chassis provides an electrical ground;
- a contact button coupled to the magnetic disc drive spindle and the chassis, for electrically contacting the magnetic disc drive spindle and the chassis;
- a compression spring coupled to the contact button, and extending generally co-axial with the magnetic disc drive spindle for urging the contact button in a direction generally co-axial with the magnetic disc drive spindle.

11. The apparatus of claim 10 wherein the compression spring is carried by the magnetic disc drive spindle, the contact button is slidably recevied by the magnetic disc drive spindle and the compression spring urges the contact button against a contact area of the chassis.

12. The apparatus of claim 10 including an arm coupled to the chassis, wherein the compression spring is carried by the arm, the contact button is slidably received by the arm, and the compression spring urges the contact button against a contact area other magnetic disc drive spindle, the contact area of the magnetic disc drive spindle being proximate the axis of rotation of the magnetic disc drive spindle.

13. The apparatus of claim 10 wherein the contact button and the axis of rotation of the magnetic disc drive spindle are substantially co-axial.

14. The apparatus of claim 10 wherein the compression spring has a spring constant of about 40 grams/inch and to about 63 grams/inch.

15. The apparatus of claim 10 wherein the contact button comprises silver graphite.

16. The apparatus of claim 10 wherein the compression spring comprises a coil spring.

17. The apparatus of claim 16 wherein the coil spring has about 34 coilings to about 52 coilings.

18. The apparatus of claim 16 wherein the coil spring comprises coiled wire having a diameter of about 0.010 inches to about 0.020 inches.

19. The apparatus of claim 16 wherein electrical resistance between the disc drive spindle shaft and the fixed contact arm is about 1.0 $\Omega$ to about 20 $\Omega$.

20. An apparatus comprising:
- a magnetic storage disc for storing magnetically encoded information;
- a magnetic disc drive spindle coupled to the magnetic storage disc, the magnetic disc drive spindle having an axis of rotation wherein the magnetic disc drive spindle and the magnetic storage disc rotate around the axis of rotation;
- a chassis operably coupled to the magnetic disc drive spindle, wherein the chassis provides an electrical ground;
- electrical contact means coupled to the magnetic disc drive spindle and the chassis, for electrically contacting the magnetic disc drive spindle and the chassis; and
- urging means coupled to the electrical contact means, for urging the electrical contact means in a direction generally co-axial with the magnetic disc drive spindle, wherein the urging means is carried by the magnetic disk drive spindle.

* * * * *

UNITED STATES PATENT AND TRADEMARK OFFICE
CERTIFICATE OF CORRECTION

PATENT NO.  : 5,140,479
DATED       : August 18, 1992
INVENTOR(S) : JOHN W. ELSING, WILLIAM J. KOSTECKA It is certified that error appears in the above-identified patent and that said Letters Patent is hereby corrected as shown below:

On the title page, Item [56]:
Under the References Cited Section, insert the following:

OTHER PUBLICATIONS

The Polymer Corporation; Product Bulletin Brochure,
   Nov. 1987

Col. 5, line 43, delete "other", insert "of the"

Signed and Sealed this

Twenty-third Day of November, 1993

Attest:

BRUCE LEHMAN

*Attesting Officer*     *Commissioner of Patents and Trademarks*